United States Patent
Ohnishi et al.

(10) Patent No.: US 7,337,062 B2
(45) Date of Patent: Feb. 26, 2008

(54) WALKER NAVIGATION DEVICE AND PROGRAM

(75) Inventors: Keisuke Ohnishi, Tokyo (JP); Takayuki Matsunaga, Tokyo (JP)

(73) Assignee: Navitime Japan Co., Ltd., Tokyo (JP)

( * ) Notice: Subject to any disclaimer, the term of this patent is extended or adjusted under 35 U.S.C. 154(b) by 322 days.

(21) Appl. No.: 10/533,929

(22) PCT Filed: Feb. 19, 2004

(86) PCT No.: PCT/JP2004/001860

§ 371 (c)(1),
(2), (4) Date: May 4, 2005

(87) PCT Pub. No.: WO2004/076974

PCT Pub. Date: Sep. 10, 2004

(65) Prior Publication Data

US 2006/0025922 A1    Feb. 2, 2006

(30) Foreign Application Priority Data

Feb. 28, 2003    (JP)    ............................... 2003-052476

(51) Int. Cl.
*G01C 21/34* (2006.01)
*G01C 21/28* (2006.01)

(52) U.S. Cl. ................. 701/211; 701/213; 342/357.06; 340/539.13

(58) Field of Classification Search ..................... None
See application file for complete search history.

(56) References Cited

U.S. PATENT DOCUMENTS 6,204,807 B1 *    3/2001    Odagiri et al.    .........    342/357.06

FOREIGN PATENT DOCUMENTS

| JP | 8-334337 | 12/1996 |
|---|---|---|
| JP | 11-083529 | 3/1999 |
| JP | 2000-329578 | 11/2000 |
| JP | 2001-509883 | 7/2001 |
| WO | 98/25107 | 6/1998 |

* cited by examiner

*Primary Examiner*—Michael J. Zanelli
(74) *Attorney, Agent, or Firm*—Westerman, Hattori, Daniels & Adrian, LLP.

(57) ABSTRACT

A pedestrian navigation device (10A) of this invention comprises a position information reception portion (12), which obtains current position information from a GPS (20); a position information analysis portion (13), which analyzes current position information received by the position information reception portion (12) and calculates the current position; a MAPDB (Map Data Base) (14), which stores map information; a central processing portion (11), which calculates current position display information, based on the current position calculated by the position information analysis portion (13) and on map information stored in the MAPDB (14); a display portion, which displays current position display information calculated by the central processing portion (11); and an input portion (16), which inputs route search conditions and issues instructions to begin navigation. By this means, a pedestrian navigation device is provided which, when navigating a pedestrian route, is able to accurately detect the direction of advance through judgment of stops and suppression of meandering.

25 Claims, 10 Drawing Sheets

$a_0 \sim a_8$: GPS SPECIFIED POSITIONS

WALKER NAVIGATION DEVICE AND PROGRAM

TECHNICAL FIELD

This invention relates to a pedestrian navigation device and program for navigation of the route of a pedestrian. In particular, this invention relates to a pedestrian navigation device and program capable of accurately detecting the direction of advance through judgment of stops and suppression of meandering.

BACKGROUND ART

In the prior art, there are navigation devices, portable telephones and similar which provide navigation of routes for vehicles and persons using position information from the GPS (Global Positioning System).

For example, Japanese Patent Laid-open No. 8-334337 discloses a current position calculation device capable of returning to an initial value a travel distance coefficient, used to calculating travel distances, which is corrected in accordance with vehicle travel.

In this current position calculation device, an MPU multiplies the number of output pulses from a vehicle velocity sensor, counted by a counter, by a travel distance coefficient to calculate the travel distance of the vehicle, and estimates the traveled road being traveled by the vehicle and the current position of the vehicle on the traveled road based on map data stored on a CD-ROM, the vehicle direction of advance determined from measured values of an angular velocity sensor and bearing sensor, and the distance traveled by the vehicle. Here, the travel distance coefficient is dynamically corrected according to the difference between the direction of the traveled road at the estimated current position and the direction of advance of the vehicle. When the MPU is instructed by a switch to correct the estimated current position, the travel distance coefficient is returned to an initial value in response to the instruction.

Thus by returning to an initial value as necessary a travel distance coefficient which is used to calculate travel distances, and which is correct as the vehicle travels, the current position of the vehicle can be accurately detected.

There is a radial error of approximately 10 meters in the position information from the GPS; by means of a current position calculation device such as that described in Japanese Patent Laid-open No. 8-334337 and ordinary vehicle navigation systems, position information when there is motion equal to or greater than a prescribed distance exceeding this error is used to detect the current position.

DISCLOSURE OF THE INVENTION

However, when the velocity of motion is slow, as in the case of a pedestrian, if position is displayed at prescribed time intervals, the display is such as that shown in FIG. 9. That is, when the actual route of movement is "a→b→c→d→e", the displayed route is "a→b'→c'→d'→e' (meandering route)", and the display is not accurate.

Further, in the case of a conventional navigation device, when a pedestrian [begins to] move after having stopped, even if the actual route of movement is "a0→a8" as shown in FIG. 10, if the route is displayed at prescribed time intervals, the route "a0→a1→a2→a3→a4→a5→a6→a7→a8" is displayed, and the stopped state cannot be accurately displayed.

Hence one object of this invention is to provide a pedestrian navigation device and program capable of accurately detecting the direction of advance, through judgment of stops and suppression of meandering, when navigating the route of a pedestrian.

In order to attain this object, the pedestrian navigation device of a first aspect of the invention is a pedestrian navigation device which navigates the route of a pedestrian, comprising position information reception means for obtaining current position information; position information analysis means for analyzing current position information received by the position information reception means and calculating the current position; map information storage means for storing map information; central processing means for calculating current position display information, based on the current position calculated by the current position analysis means, and on map information stored by the map information storage means; and display means for displaying the current position display information calculated by the central processing means; and characterized in that the central processing means has pedestrian history information comprising a reference direction a indicating the direction of past routes of movement and a reference distance β indicating a prescribed distance, and that, when the current position at the start of navigation is reference point a0 and the current position ai after a prescribed time is received from the position information analysis means, [the central processing means] calculates the distance La0ai between the reference point a0 and the current position ai, and when $$\beta > La0ai \quad (1)$$

corrects the current position ai in the direction of the reference direction a and calculates the current position display information, but when $$\beta \leq La0ai \quad (2)$$

corrects the current position ai in the direction of the reference direction a and calculates the current position display information, and in addition takes the corrected position of the current position ai to be the new reference point, and takes the direction from the reference point a0 to the new reference point to be the new reference direction α.

Also, in order to attain the above object, the pedestrian navigation device of a second aspect of the invention is a pedestrian navigation device which navigates the route of a pedestrian, comprising position information reception means for obtaining current position information; position information analysis means for analyzing current position information received by the position information reception means and calculating the current position; map information storage means for storing map information; central processing means for calculating current position display information, based on the current position calculated by the current position analysis means, and on map information stored by the map information storage means; and display means for displaying the current position display information calculated by the central processing means; and characterized in that the central processing means receives the current position ai from the position information analysis means at prescribed intervals, and when the absolute values of the difference between the direction angle Ai from the preceding current position ai-1 to the present current position ai and the reference angle A is such that $$\alpha 0 \text{ (tolerance angle)} \leq |A - Ai| \quad (3)$$

calculates the current position display information from the current position ai, and takes the direction angle Ai to be the new reference angle A.

Also, in order to attain the above object, the pedestrian navigation device of a third aspect of the invention is a pedestrian navigation device which navigates the route of a pedestrian, comprising position information reception means for obtaining current position information; position information analysis means for analyzing current position information received by the position information reception means and calculating the current position; map information storage means for storing map information; central processing means for calculating current position display information, based on the current position calculated by the current position analysis means, and on map information stored by the map information storage means; and display means for displaying the current position display information calculated by the central processing means; and characterized in that the central processing means takes the current position at the start of navigation as the reference point a0, receives the current position ai at prescribed intervals from the position information analysis means, calculates the distance La0ai between the reference position a0 and the current position ai, and when $$\beta(\text{reference distance}) > La0ai \quad (4)$$

calculates the current position display information from the current position ai, but when $$\beta(\text{reference distance}) \leq La0ai \quad (5)$$

calculates the current position display information from the current position ai, and in addition takes the current position ai to be the new reference point, and takes the direction from the previous reference point a0 to the new reference point ai to be the new reference direction α.

Here, the central processing means takes the current position at the time navigation is started to be the reference point a0, receives the current position ai at prescribed intervals from the position information analysis means, and calculates the distance La0ai between the reference point a0 and the current position ai; if $$\beta(\text{reference distance}) > La0ai \quad (4)$$

then the current position display information is calculated from the current position ai, but if $$\beta(\text{reference distance}) \leq La0ai \quad (5)$$

then it is also possible to calculate the current position display information from the current position ai, and in addition to take the current position a1 calculated next after the reference point a0 to be the new reference point, and to take the direction from the reference point a0 to the current position ai to be the new reference direction α.

Also, in order to attain the above object, the pedestrian navigation device of a fourth aspect of the invention is a pedestrian navigation device which navigates the route of a pedestrian, comprising position information reception means for obtaining current position information; position information analysis means for analyzing current position information received by the position information reception means and calculating the current position; map information storage means for storing map information; central processing means for calculating current position display information, based on the current position calculated by the current position analysis means, and on map information stored by the map information storage means; and display means for displaying the current position display information calculated by the central processing means; and characterized in that the central processing means has a reference direction a indicating the direction of the past movement route and a prescribed tolerance angle γ, takes the current position at the time of the start of navigation to be the reference point a0, and upon receiving the current position ai a prescribed time later from the position information analysis means, calculates the direction a0→ai [from] the reference point a0 to the current position ai, and (a) if the direction a0→ai is equivalent to the reference direction a within the range of the tolerance angle γ, uses the current position display information calculated using the reference point a0 without modification, but (b) if the direction a0→ai is not equivalent to the reference direction a within the range of the tolerance angle γ, calculates the current position display information using the current position ai, and in addition takes the corrected position of the current position ai to be the new reference point, and takes the direction from the reference point a0 to the new reference point ai to be the new reference direction α.

Also, in order to attain the above object, the pedestrian navigation device of a fifth aspect of the invention is a pedestrian navigation device which navigates the route of a pedestrian, comprising position information reception means for obtaining current position information; position information analysis means for analyzing current position information received by the position information reception means and calculating the current position; map information storage means for storing map information; central processing means for calculating current position display information, based on the current position calculated by the current position analysis means, and on map information stored by the map information storage means; display means for displaying the current position display information calculated by the central processing means; and direction measurement means for measuring the direction of advance; and characterized in that the central processing means takes the current position at the time of the start of navigation to be the reference point a0, and upon receiving the current position a1 a prescribed time later from the position information analysis means, corrects the current position a1 using the direction of advance measured by the direction measurement means and calculates current position display information, and in addition takes the corrected current position a1 to be the new reference point.

Also, in order to attain the above object, the pedestrian navigation device of a sixth aspect of the invention is a pedestrian navigation device which navigates the route of a pedestrian, comprising position information reception means for obtaining current position information; position information analysis means for analyzing current position information received by the position information reception means and calculating the current position; map information storage means for storing map information; central processing means for calculating current position display information, based on the current position calculated by the current position analysis means, and on map information stored by the map information storage means; display means for displaying the current position display information calculated by the central processing means; and direction measurement means for measuring the direction of advance; and characterized in that the central processing means takes the current position at the time of the start of navigation to be the reference point a0, and upon receiving the current position ai a prescribed time later from the position information analysis means, calculates the direction a0→ai [from] the reference point a0 to the current position ai, and (a) if the direction a0→ai is outside the range of the tolerance angle γ from the direction of advance measured by the direction measurement means, uses the current position display information calculated using the reference point a0 without modification, but (b) if the direction a0→ai is within the range of the tolerance angle γ from the direction of advance measured by the direction measurement means, calculates the current position display information using the current position ai, and in addition takes the corrected position of the current position ai to be the new reference point.

Here, the direction measurement means can be an electronic compass or a gyrosensor.

The position information reception means can obtain current position information from the GPS (Global Positioning System).

In order to attain the above object, a program of this invention is a program which causes a portable terminal to navigate the route of a pedestrian, and is characterized in realizing the functions of the above-described pedestrian navigation devices in the portable terminal.

By correcting position information using a reference distance, reference direction, tolerance angle, electronic compass, gyrosensor and similar, the direction of advance can be detected accurately through judgment of stops and suppression of meandering when navigating the route of a pedestrian.

BEST MODE FOR CARRYING OUT THE INVENTION

Figure 1:
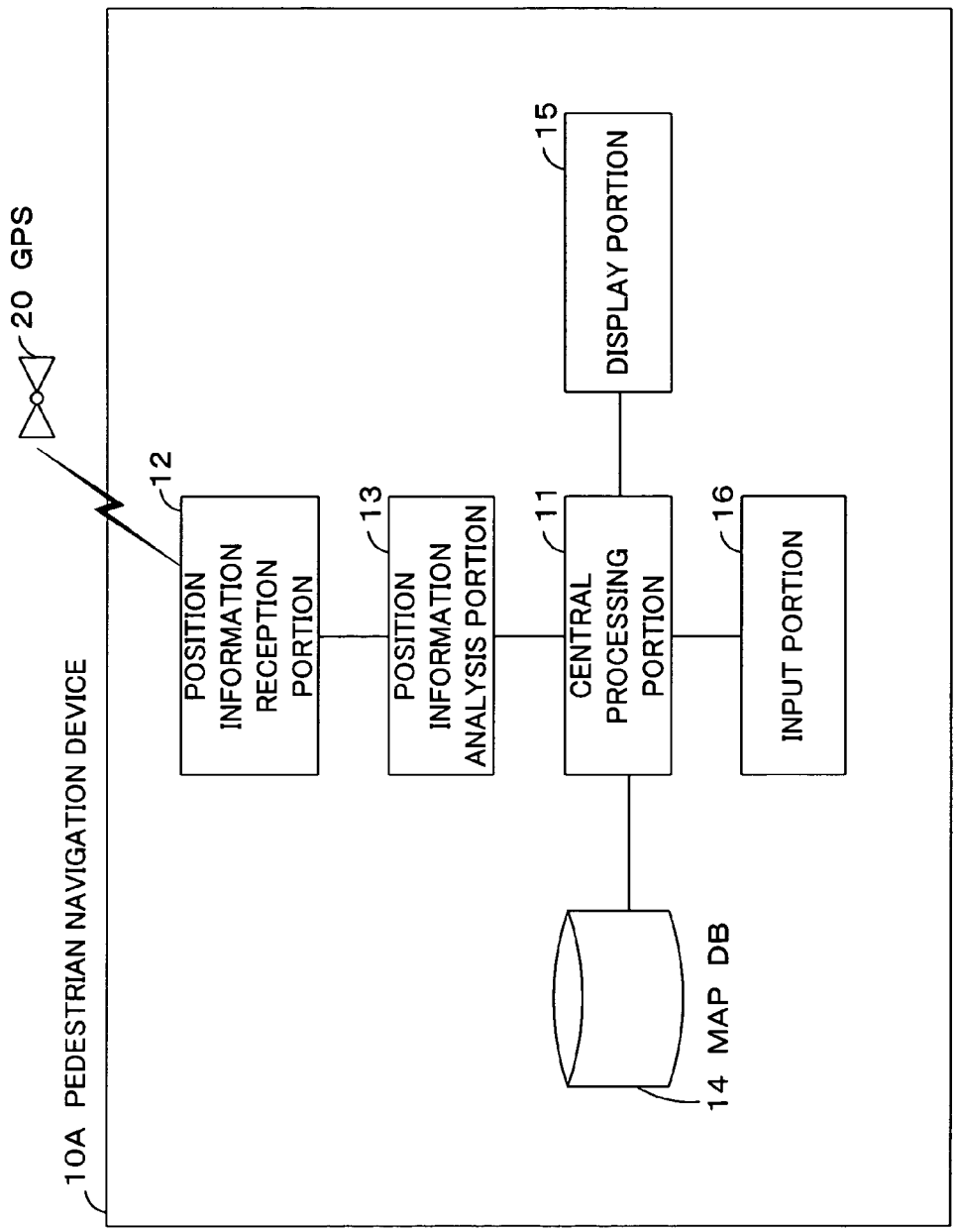
FIG. 1 shows one example of a pedestrian navigation device of this invention.

Below, aspects of a pedestrian navigation device and program of the invention are explained, referring to the drawings.

Of course the scope of this invention is not limited to these aspects.

FIG. 1 shows one example of a pedestrian navigation device of this invention. In FIG. 1, the pedestrian navigation device 10A comprises a position information reception portion 12, which obtains current position information from the GPS (Global Positioning System) 20; a position information analysis portion 13, which analyzes current position information received by the position information reception portion 12 and calculates the current position; a MAPDB (Map Data Base) 14, which stores map information; a central processing portion 11, which calculates current position display information based on the current position calculated by the position information analysis portion 13 and on map information stored in the MAPDB 14; a display portion 15, which displays current position display information calculated by the central processing portion 11; and an input portion 16, which inputs route search conditions and instructions to begin navigation.

Figure 2:
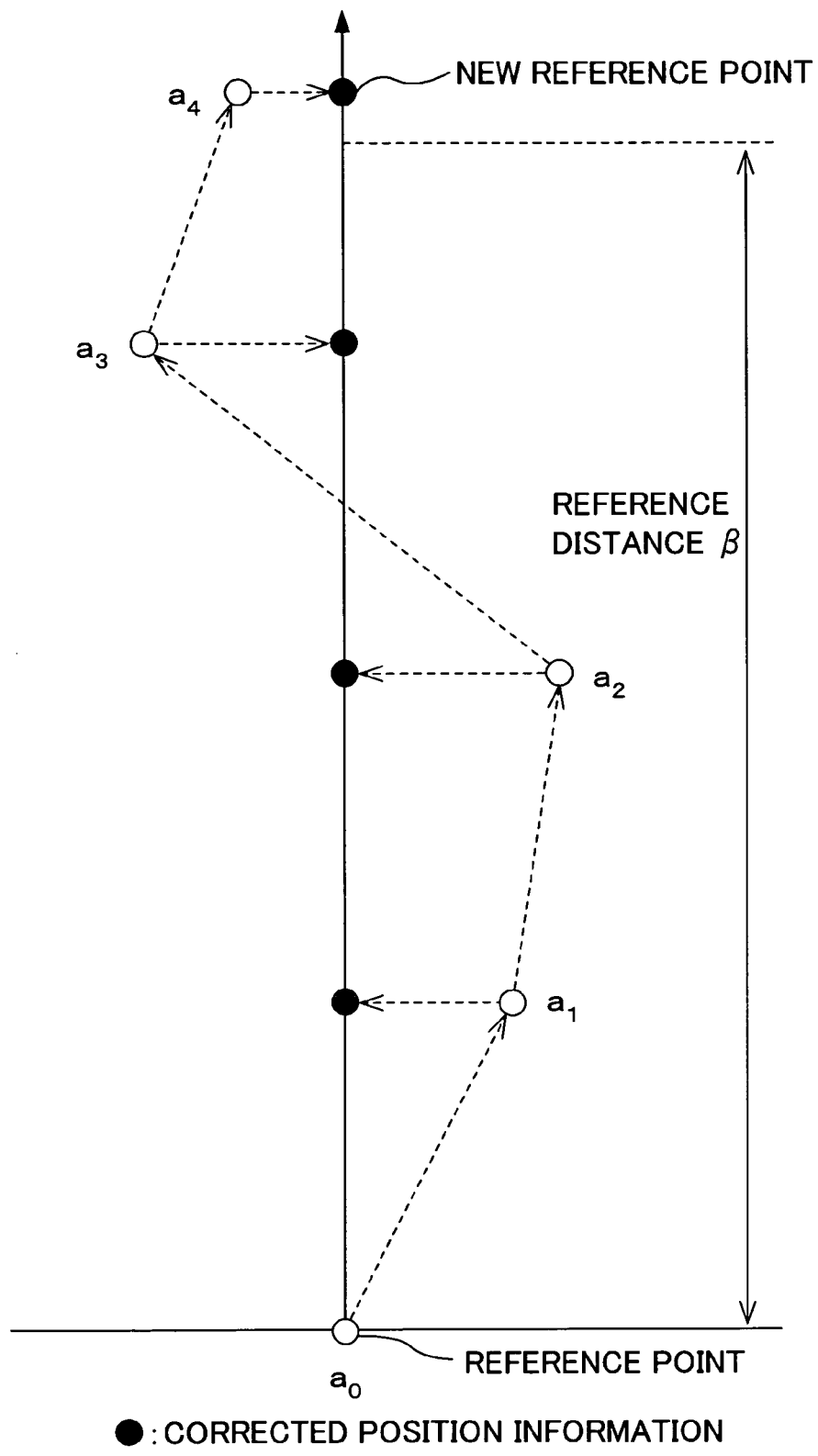
FIG. 2 shows a route display by a pedestrian navigation device of this invention.

FIG. 2 shows a route display by a pedestrian navigation device of this invention. In FIG. 1 and FIG. 2, the route of a pedestrian is displayed on the display portion 15, in accordance with input of the route search conditions and an instruction to begin navigation from the input portion 16. Here, the current position at the start of navigation is taken to be the initial reference point a0. The current position ai after a certain time has elapsed is calculated by receiving current position information from the GPS by the position information reception portion 12, and analyzing the current position information in the position information analysis portion 13; this current position is passed to the central processing portion 11.

The central processing portion 11 has pedestrian history information, including a reference direction α which indicates the direction of the past movement route and a reference distance β which indicates a prescribed distance. When the current position ai after a prescribed time ti (seconds) is received from the position information analysis portion 13, the distance La0ai between the reference point a0 and current position ai is calculated, and when $$\beta > La0ai \quad (1)$$

the current position ai is corrected in the direction of the reference direction α and the current position display information is calculated, but when $$\beta \leq La0ai \quad (2)$$

the current position ai is corrected in the direction of the reference direction α and the current position display information is calculated, and in addition the corrected position of the current position ai is taken to be the new reference point, and the direction from the reference point a0 to the new reference point is taken to be the new reference direction α.

In FIG. 2, each corrected position is at a position descended along a perpendicular line from the current position ai (i=1 to 4) on the straight line in the reference direction α. Here, positions advanced by the distance "ai-1 to ai" from the corrected position ai-1 in the α direction can be called corrected positions. In FIG. 2, the corrected position of the current position a4 becomes the new reference point.

Figure 3:
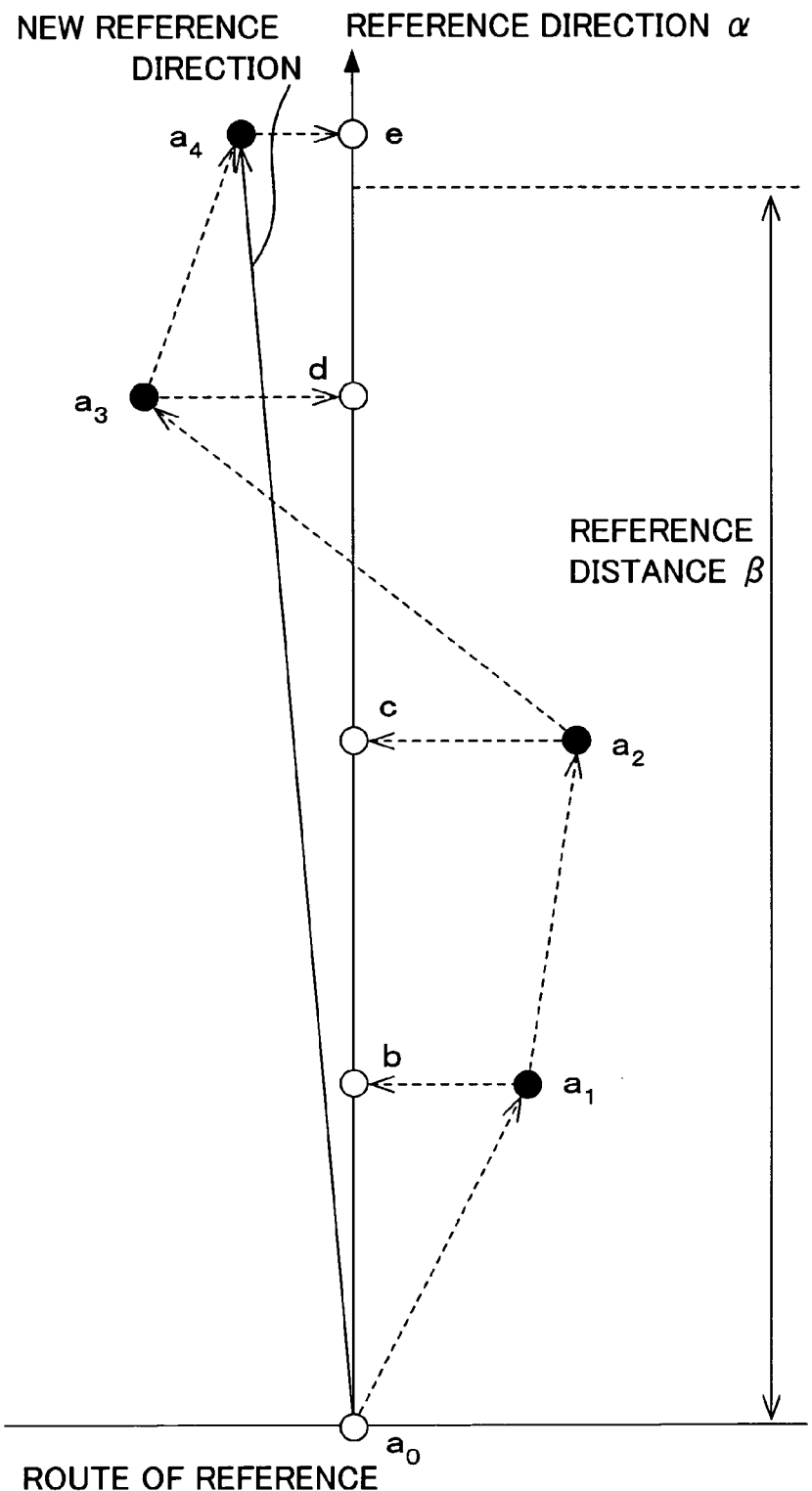
FIG. 3 shows a route display by a pedestrian navigation device of this invention.

FIG. 3 shows a route display by the pedestrian navigation device of the invention shown in FIG. 1. In FIG. 1 and FIG. 3, the route of the pedestrian is displayed on the display portion 15 according to input of route search conditions and an instruction to start navigation from the input portion 16. Here, the current position at the time of the start of navigation is taken to be the initial reference point a0. The current position ai after a certain time has elapsed is calculated by receiving current position information from the GPS using the position information reception portion 12 and analyzing the current position information using the position information analysis portion 13, and is then passed to the central processing portion 11.

Here, the central processing means calculates the distance La0ai from the reference point a0 to the current position ai, and when $$\beta(\text{reference distance}) > La0ai \quad (4)$$

calculates the current position display information from the current position ai, but when $$\beta(\text{reference distance}) \leq La0ai \quad (5)$$

calculates the current position display information from the current position ai, and in addition takes the current position ai to be the new reference point, and takes the direction from the previous reference point a0 to the new reference point ai to be the new reference direction $\alpha$.

Here, the reference direction $\alpha$ can also be used to correct the current position ai in the direction of the reference direction $\alpha$, before calculating the current position display information.

Hence as shown in FIG. 3, the display route can be displayed as "a0→a1→a2→a3→a4", and can also be displayed as "a0→b→c→d→e". In FIG. 3, the current position a4 or the corrected position thereof e becomes the new reference point, and the direction from the previous reference point a0 to the new reference point a4 or e becomes the new reference direction $\alpha$.

Figure 4:
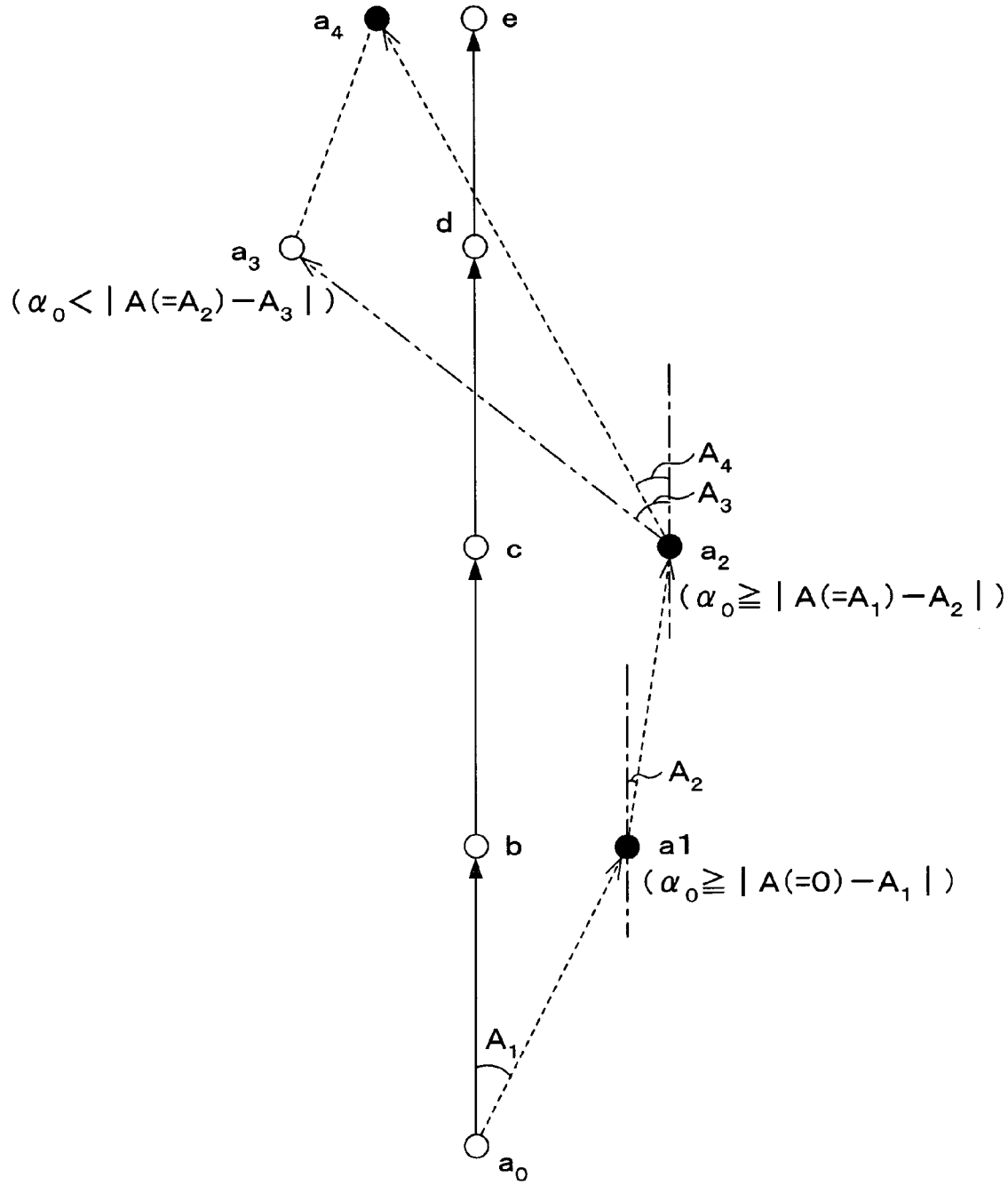
FIG. 4 shows a route display by a pedestrian navigation device of this invention.

FIG. 4 shows a route display by the pedestrian navigation device of this invention of FIG. 1. In FIG. 1 and FIG. 4, the route of the pedestrian is displayed on the display portion 15 according to input of route search conditions and an instruction to start navigation from the input portion 16. Here, the current position at the time of the start of navigation is taken to be the initial reference point a0. The current position ai after a certain time has elapsed is calculated by receiving current position information from the GPS using the position information reception portion 12 and analyzing the current position information using the position information analysis portion 13, and is then passed to the central processing portion 11.

Here, the central processing means receives the current position ai at prescribed intervals from the position information analysis portion 13, and when the absolute value of the difference between the direction angle Ai from the previous current position ai-1 to the present current position ai and the reference angle A is such that $$\alpha 0 \text{ (tolerance angle)} \geq |A - Ai| \quad (3)$$

calculates the current position display information from the current position ai, and takes the direction angle Ai to be the new reference angle A.

In FIG. 4, upon moving from a0 to a1, the initial reference angle A is "A=0". Here, the absolute value (A1) of the difference between the direction angle A1 from a0 to a1 and the reference angle A is within the range of the tolerance angle $\alpha$, so that based on the current position a1 and the map information stored in MABPDB 14, the current position display information is calculated, and the direction angle A1 becomes the reference angle A. Then, when moving from a1 to a2, the reference angle A is "A=A1". Here, the absolute value of the difference between the direction angle A2 from a1 to a2 and the reference angle A (=A1) (|A(=A1)-A2|) is within the range of the tolerance angle $\alpha$, so that based on the current position a2 and map information stored in MAPDB 14, the current position display information is calculated, and the direction angle A2 becomes the new reference angle A.

Next, when moving from a2 to a3, the reference angle A is "A=A2". Here, the absolute value of the difference between the direction angle A3 from a2 to a3 and the reference angle A (=A2) (|A(=A2)-A3|) exceeds the range of the tolerance angle $\alpha$, so that the data of the current position a3 is not used, and the position is not displayed. When moving to a4, the reference angle A is "A=A2", so that using the direction angle A4 from a2 to a4 and the reference angle A (=A2), the absolute value of the difference (|A(=A2)-A4|) is compared with the tolerance angle $\alpha$. Because the value (|A(=A2)-A4|) is within the range of the tolerance angle $\alpha$, current position display information is calculated based on the current position a4 and map information stored in MAPDB 14, and the direction angle A4 is taken to be the new reference angle A. In this way, route display is performed.

Figure 5:
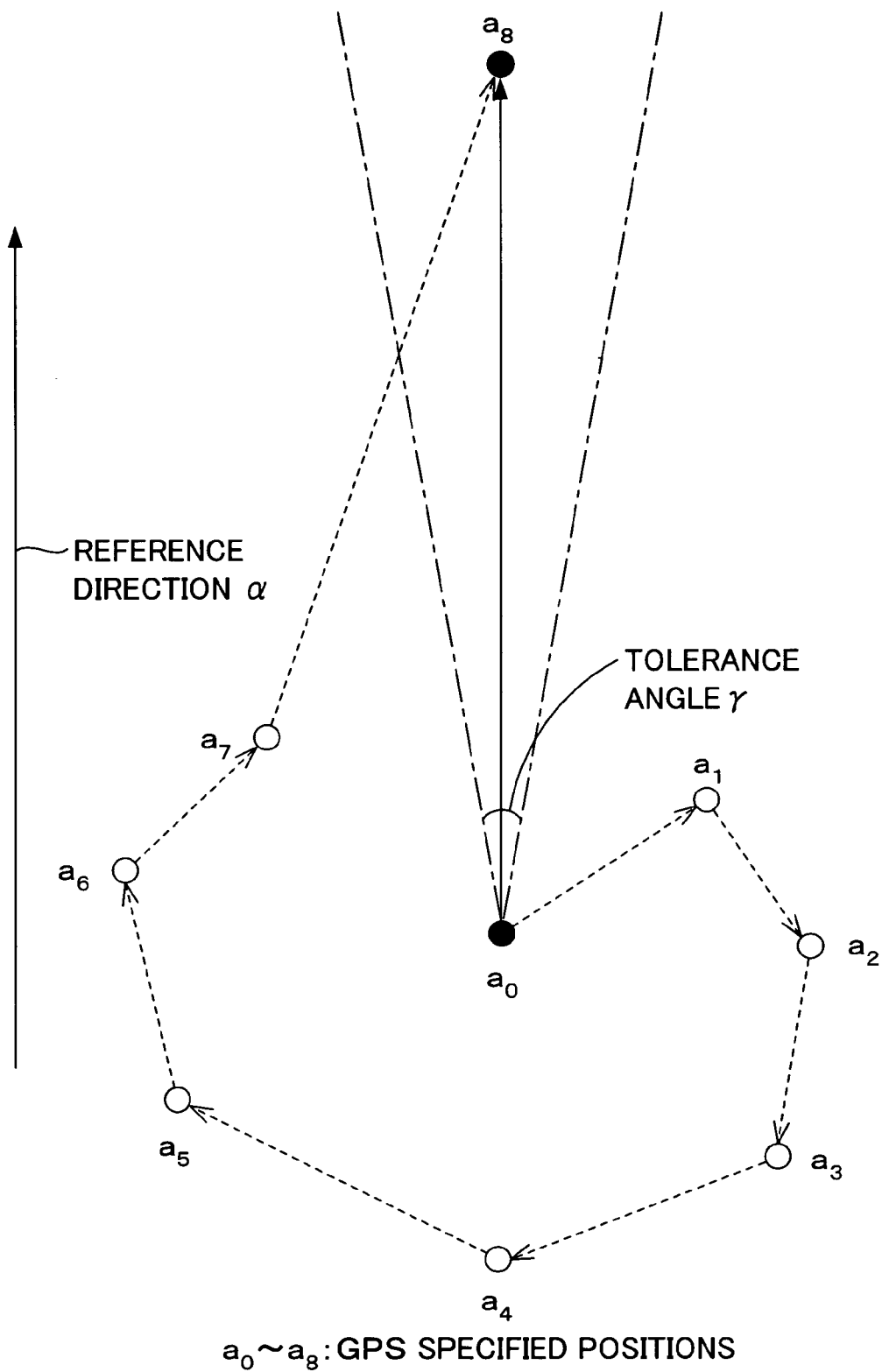
FIG. 5 shows a route display by a pedestrian navigation device of this invention.

FIG. 5 shows a route display by the pedestrian navigation device of this invention of FIG. 1. In FIG. 1 and FIG. 5, the route of the pedestrian is displayed on the display portion 15 according to input of route search conditions and an instruction to start navigation from the input portion 16. Here, the current position at the time of the start of navigation is taken to be the initial reference point a0. The current position ai after a certain time has elapsed is calculated by receiving current position information from the GPS using the position information reception portion 12 and analyzing the current position information using the position information analysis portion 13, and is then passed to the central processing portion 11.

Here, the central processing means has a reference direction $\alpha$ indicating the direction of the past movement route and a prescribed tolerance angle $\gamma$, and when receiving the current position ai from the position information analysis means after a prescribed time t (seconds), calculates the direction a0→ai from the reference point a0 to the current position ai; and (a) if the direction a0→ai is outside the range of the tolerance angle $\gamma$ from the reference direction $\alpha$, the current position display information is calculated using the reference point a0 without modification, and in addition the corrected current position ai is taken to be the new reference point, but (b) if the direction a0→ai is within the range of the tolerance angle $\gamma$ from the reference direction $\alpha$, the current position display information is calculated using the current position ai, and in addition the corrected position of the current position ai is taken to be the new reference point, and the direction from the previous reference point a0 to the new reference point ai is taken to be the new reference direction $\alpha$.

In FIG. 5, if the pedestrian is stopped at reference point a0, the position information calculated using current position information from the GPS is a1 to a7. At this time, the direction a0→ai (i=1 to 7) is outside the range of the tolerance angle $\gamma$ from the reference direction $\alpha$, so that the position information a1 to a7 is not used in calculating the current position display information, and is not displayed as route information. Next, when the pedestrian moves and the position information a8 is calculated using current position information from the GPS, the direction a0→a8 is within the range of the tolerance angle $\gamma$ from the reference direction $\alpha$, so that the position information a8 is used in calculating current position display information, and "a0→a8" is displayed as route information.

Figure 6:
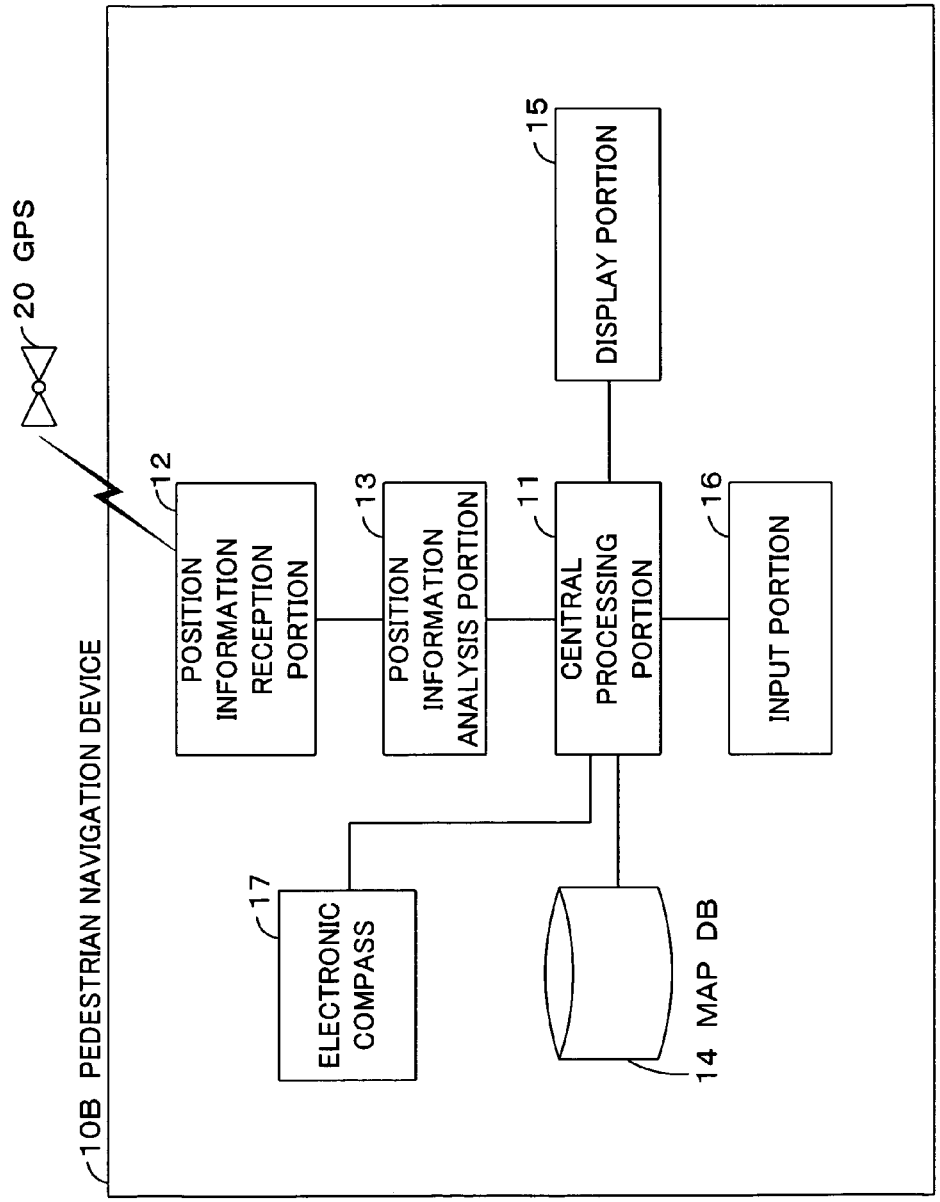
FIG. 6 shows one example of a pedestrian navigation device of this invention.

FIG. 6 shows one example of a pedestrian navigation device of this invention. In FIG. 6, the pedestrian navigation device 10B comprises a position information reception portion 12, which obtains current position information from the GPS 20; a position information analysis portion 13, which analyzes current position information received by the position information reception portion 12 and calculates the current position; a MAPDB (Map Data Base) 14, which stores map information; a central processing portion 11, which calculates current position display information based on the current position calculated by the position information analysis portion 13 and on map information stored in the MAPDB 14; a display portion 15, which displays current position display information calculated by the central processing portion 11; an input portion 16, which inputs route search conditions and instructions to begin navigation; and an electronic compass 17, which measures the direction of advance. Here, in place of the electronic compass 17, a gyrosensor may be used.

Figure 7:
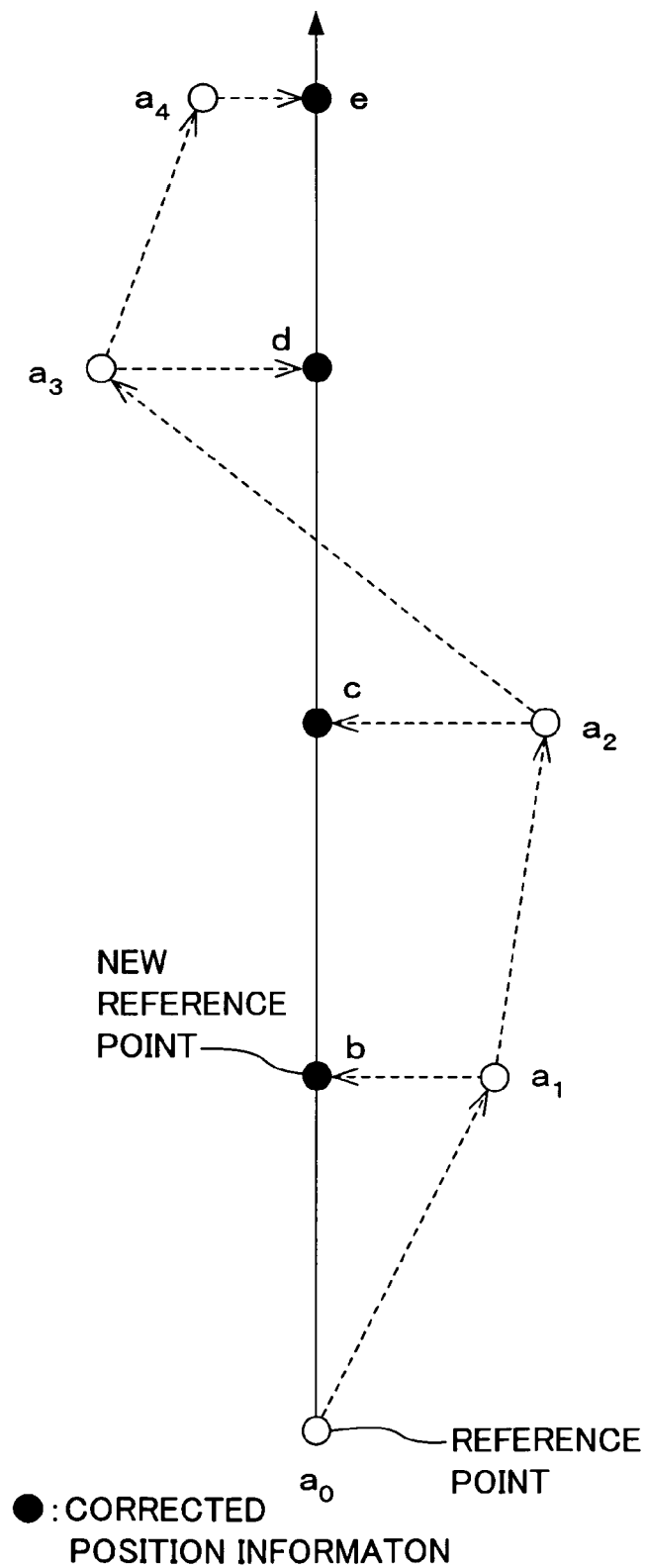
FIG. 7 shows a route display by a pedestrian navigation device of this invention.

FIG. 7 shows a route display by the pedestrian navigation device of this invention in FIG. 6. In FIG. 6 and FIG. 7, the route of the pedestrian is displayed on the display portion 15 according to input of route search conditions and an instruction to start navigation from the input portion 16. Here, the current position at the time of the start of navigation is taken to be the initial reference point a0. The current position ai after a certain time has elapsed is calculated by receiving current position information from the GPS using the position information reception portion 12 and analyzing the current position information using the position information analysis portion 13 to calculate the current position, which is then passed to the central processing portion 11.

The electronic compass 17 (or gyrosensor) detects the electronic compass direction (reference direction α) indicating the direction of the movement route, and passes this to the central processing portion 11. The central processing portion 11, upon receiving the current position ai after a prescribed time ti (seconds) from the position information analysis portion 13, corrects the current position ai in the direction of the reference direction α to calculate current position display information, and takes the corrected current position ai to be the new reference point.

In FIG. 7, the central processing portion 11, upon receiving the current position a1 after a prescribed time t1 (seconds) from the position information analysis portion 13, corrects the current position a1 in the electronic compass direction (the reference direction α) to calculate current position display information, and takes the corrected current position information b of the current position ai to be the new reference point. Similarly, the corrected position information [values] c to e of the sequence of current positions a2 to a4 are used to calculate current position display information.

Figure 8:
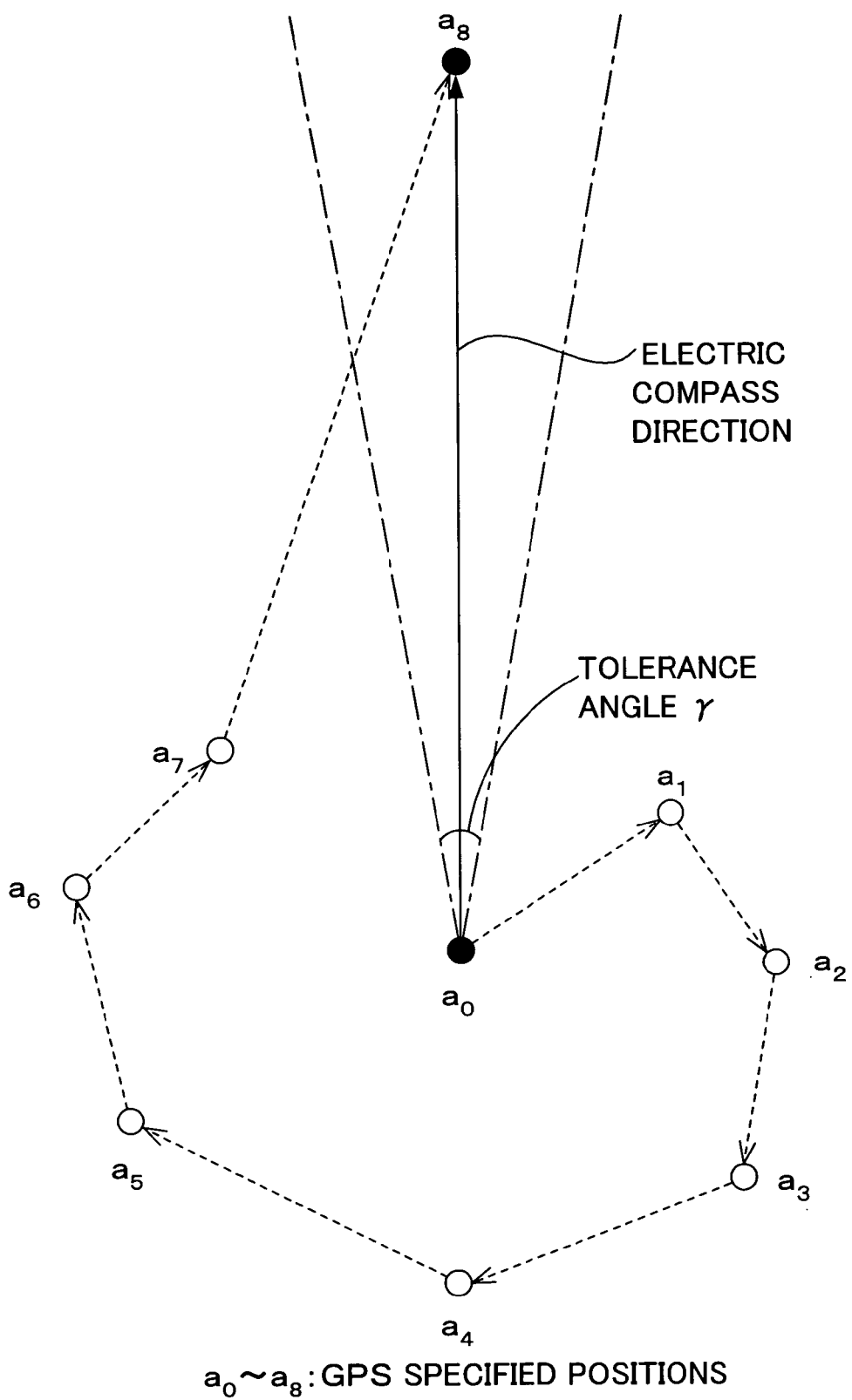
FIG. 8 shows a route display by a pedestrian navigation device of this invention.
Figure 9:
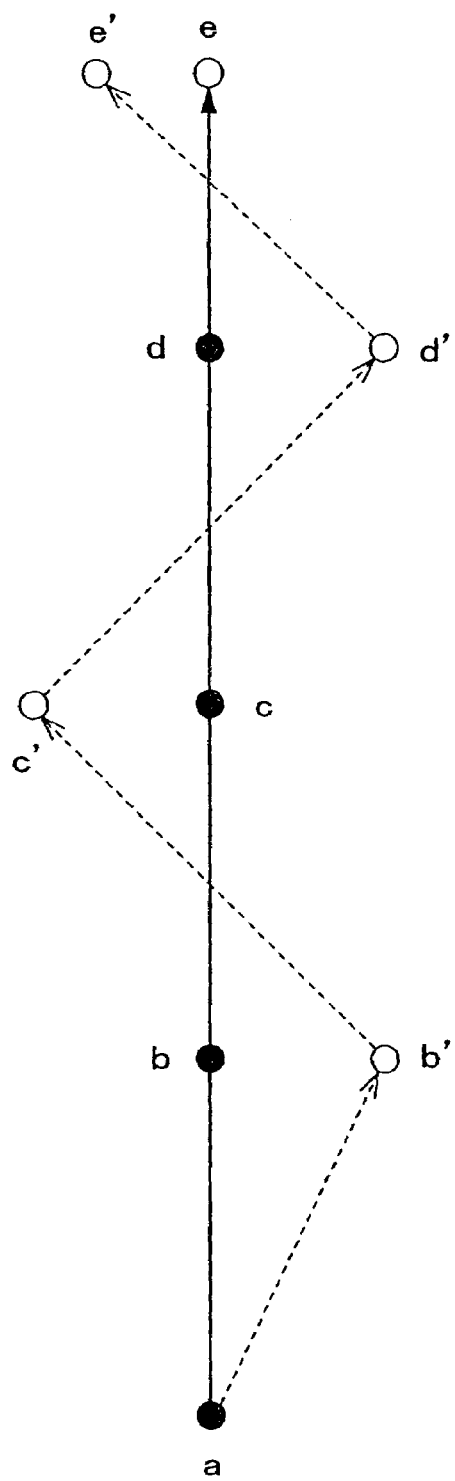
FIG. 9 shows a route display by a conventional navigation device.
Figure 10:
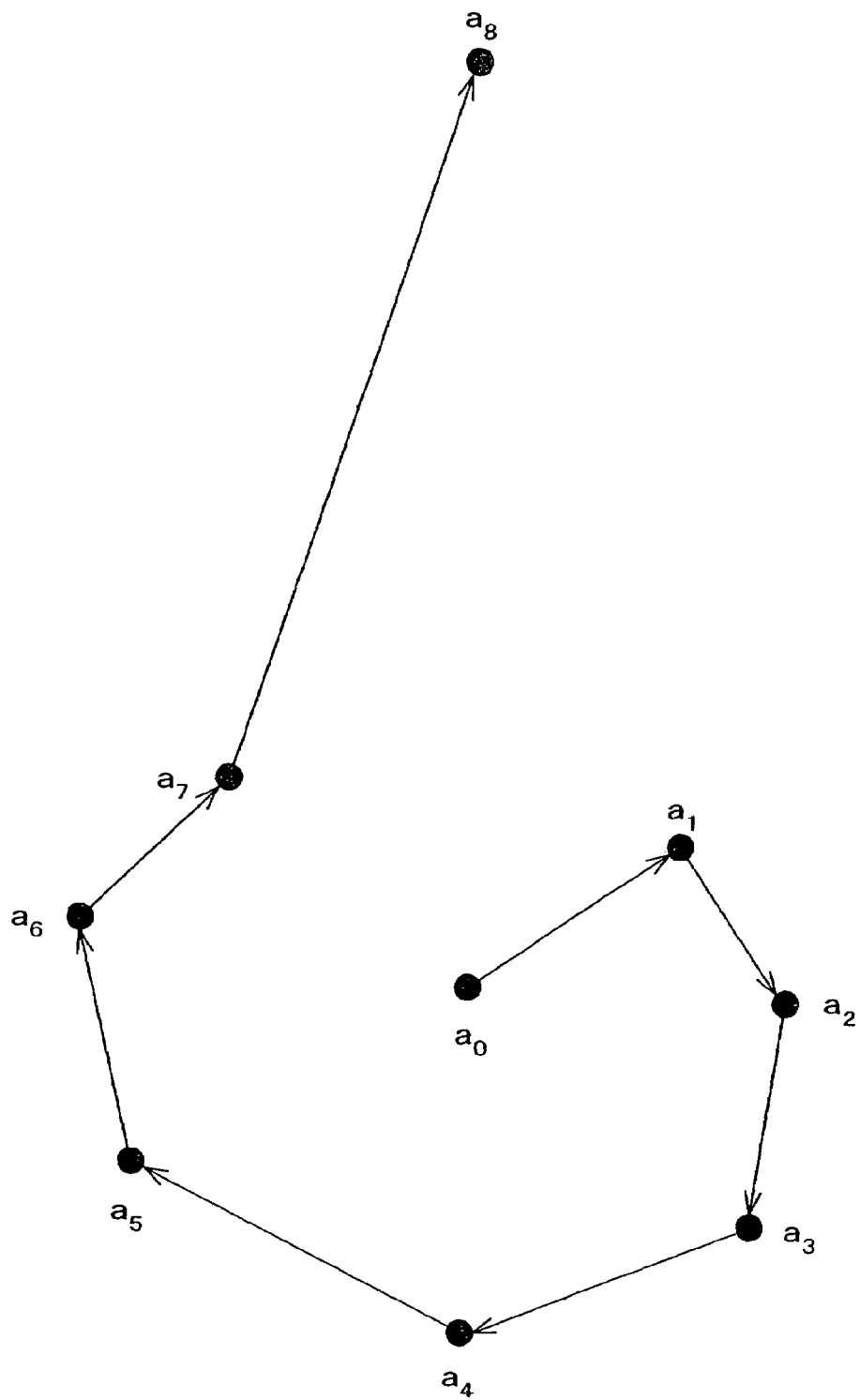
FIG. 10 shows a route display by a conventional navigation device.

FIG. 8 shows a route display by the pedestrian navigation device of this invention shown in FIG. 6. In FIG. 6 and FIG. 8, the route of the pedestrian is displayed on the display portion 15 according to input of route search conditions and an instruction to start navigation from the input portion 16. Here, the current position at the time of the start of navigation is taken to be the initial reference point a0. The current position ai after a certain time has elapsed is calculated by receiving current position information from the GPS using the position information reception portion 12 and analyzing the current position information using the position information analysis portion 13, and is then passed to the central processing portion 11.

The electronic compass 17 (or gyrosensor) detects the electronic compass direction (reference direction α) indicating the direction of the movement route, and passes this to the central processing portion 11. The central processing portion 11 takes the current position at the start of navigation to be the reference point a0, and upon receiving the current position ai after a prescribed time ti (seconds) from the position information analysis means, calculates the direction a0→ai from the reference point a0 to the current position ai; and (a) if the direction a0→ai is outside the range of the tolerance angle γ from the direction of advance measured by the direction measurement means, the current position display information calculated using the reference point a0 is used without modification, but (b) if the direction a0→ai is within the range of the tolerance angle γ from the direction of advance measured by the direction measurement means, the current position display information is calculated using the current position ai, and in addition the corrected position of the current position ai is taken to be the new reference point.

In FIG. 8, when the pedestrian is stopped at the reference point a0, the position information calculated using current position information from the GPS is a1 to a7. At this time, the direction a0→ai (i=1 to 7) is outside the range of the tolerance angle γ from the electronic compass direction (reference direction α), so that the position information [values] a1 to a7 are not used to calculate current position display information, and are not displayed as route information. Next, when the pedestrian moves and the position information a8 is calculated using current position information from the GPS, the direction a0→a8 is within the range of the tolerance angle γ from the electronic compass direction (reference direction α), so that the position information a8 is used in calculating the current position display information, and "a0→a8" is displayed as route information.

In the above, a pedestrian navigation device of this invention has been explained; but a portable telephone or other portable terminal can be provided with a program for navigation of pedestrian routes, and such a program can realize the functions of the above-described pedestrian navigation device in a portable terminal.

As explained above, through a pedestrian navigation device and program of this invention, by using a reference distance, reference direction, tolerance angle, electronic compass, gyrosensor, and similar to correct position information, the direction of advance can be detected accurately through judgment of stops and suppression of meandering when navigating pedestrian routes.

The invention claimed is:

1. A pedestrian navigation device for navigating the route of a pedestrian, comprising:

position information reception means for obtaining current position information;

position information analysis means for analyzing said current position information received by said position information reception means and calculating a current position ai;

map information storage means for storing map information;

central processing means for calculating current position display information, based on said current position ai calculated by said position information analysis means, and on said map information stored by said map information storage means; and, display means for displaying said current position display information calculated by said central processing means; and characterized in that said central processing means has pedestrian history information comprising a reference direction α indicating the direction of a past movement route and a reference distance β indicating a prescribed distance, takes the current position at the start of navigation to be reference point a0, and, upon receiving the current position ai after a prescribed time from said position information analysis means, calculates the distance La0ai between said reference point a0 and said current position ai, and when $$\beta > La0ai \qquad (1)$$

corrects said current position ai in the direction of said reference direction α and calculates current position display information, but when $$\beta \leq La0ai \qquad (2)$$

corrects said current position ai in the direction of said reference direction α and calculates current position display information, and in addition takes the corrected position of said current position ai to be the new reference point, and takes the direction from the previous reference point a0 to the new reference point to be the new reference direction α.

2. The pedestrian navigation device according to claim 1, characterized in that said position information reception means obtains current position information from a GPS (Global Positioning System).

3. A pedestrian navigation device for navigating the route of a pedestrian, comprising:

position information reception means for obtaining current position information;

position information analysis means for analyzing said current position information received by said position information reception means and calculating a current position ai;

map information storage means for storing map information;

central processing means for calculating current position display information, based on said current position ai calculated by said position information analysis means, and on said map information stored by said map information storage means; and, display means for displaying said current position display information calculated by said central processing means; and characterized in that said central processing means receives the current position ai from said position information analysis means at prescribed intervals, and when the absolute value of the difference between a direction angle Ai from the preceding current position ai-1 to the present current position ai and a reference angle A is such that $$a0 \text{ (tolerance angle)} \geq |A - Ai| \qquad (3)$$

calculates current position display information from said current position ai, and takes the direction angle Ai to be the new reference angle A.

4. The pedestrian navigation device according to claim 3, characterized in that said position information reception means obtains current position information from a GPS (Global Positioning System).

5. A pedestrian navigation device for navigating the route of a pedestrian, comprising:

position information reception means for obtaining current position information;

position information analysis means for analyzing said current position information received by said position information reception means and calculating a current position ai;

map information storage means for storing map information;

central processing means for calculating current position display information, based on said current position ai calculated by said position information analysis means, and on said map information stored by said map information storage means; and, display means for displaying said current position display information calculated by said central processing means; and characterized in that said central processing means takes the current position at the start of navigation to be the reference point a0, receives the current position ai at prescribed intervals from said position information analysis means, calculates the distance La0ai between said reference point a0 and the current position ai, and when $$\beta(\text{reference distance}) > La0ai \qquad (4)$$

calculates current position display information from said current position ai, but when $$\beta(\text{reference distance}) \leq La0ai \qquad (5)$$

calculates current position display information from said current position ai, and in addition takes said current position ai to be the new reference point, and takes the direction from the previous reference point a0 to the new reference point ai to be the new reference direction α.

6. The pedestrian navigation device according to claim 5, characterized in that said central processing means takes the current position at the start of navigation to be the reference point a0, receives the current position ai at prescribed intervals from said position information analysis means, calculates the distance La0ai between said reference point a0 and said current position ai, and when $$\beta(\text{reference distance}) > La0ai \qquad (4)$$

calculates current position display information from said current position ai, but when $$\beta(\text{reference distance}) \leq La0ai \qquad (5)$$

calculates current position display information from said current position ai, and in addition takes a current position a1 calculated next to said reference point a0 to be the new reference point, and takes the direction from the previous reference point a0 to said current position ai to be the new reference direction α.

7. The pedestrian navigation device according to claim 6, characterized in that said position information reception means obtains current position information from a GPS (Global Positioning System).

8. The pedestrian navigation device according to claim 5, characterized in that said position information reception means obtains current position information from a GPS (Global Positioning System).

9. A pedestrian navigation device for navigating the route of a pedestrian, comprising:

position information reception means for obtaining current position information;

position information analysis means for analyzing said current position information received by said position information reception means and calculating a current position ai;

map information storage means for storing map information;

central processing means for calculating current position display information, based on said current position ai calculated by said position information analysis means, and on said map information stored by said map information storage means; and, display means for displaying said current position display infonnation calculated by said central processing means; and characterized in that said central processing means has a reference direction α indicating the direction of a past movement route and a prescribed tolerance angle γ, takes the current position at the start of navigation to be reference point a0, and, upon receiving the current position ai after a prescribed time from said position information analysis means, calculates the direction a0→ai from said reference point a0 to said current position ai, and (a) if the direction a0→ai is outside the range of the tolerance angle γ from the reference direction α, uses current position display information calculated using said reference point a0 without modification; but (b) if the direction a0→ai is within the range of the tolerance angle γ from the reference direction α, calculates current position display information using said current position ai, and moreover takes a corrected position of said current position ai to be the new reference point, and takes the direction from the previous reference point a0 to the new reference point ai to be the new reference direction α.

10. The pedestrian navigation device according to claim 9, characterized in that said position information reception means obtains current position information from a GPS (Global Positioning System).

11. A pedestrian navigation device for navigating the route of a pedestrian, comprising:
position information reception means for obtaining current position information;
position information analysis means for analyzing said current position information received by said position information reception means and calculating a current position ai;
map information storage means for storing map information;
central processing means for calculating current position display information, based on said current position ai calculated by said position information analysis means, and on said map information stored by said map information storage means;
display means for displaying said current position display information calculated by said central processing means; and,
direction measurement means for measuring the direction of advance; and characterized in that
said central processing means takes the current position at the start of navigation to be reference point a0, and upon receiving a current position a1 after a prescribed time from said position information analysis means, corrects said current position a1 in said direction of advance measured by said direction measurement means and calculates current position display information, and in addition takes the corrected position of said current position a1 to be the new reference point.

12. The pedestrian navigation device according to claim 11, characterized in that said direction measurement means is an electronic compass.

13. The pedestrian navigation device according to claim 11, characterized in that said direction measurement means is a gyrosensor.

14. The pedestrian navigation device according to claim 11, characterized in that said position information reception means obtains current position information from a GPS (Global Positioning System).

15. A pedestrian navigation device for navigating the route of a pedestrian, comprising:
position information reception means for obtaining current position information;
position information analysis means for analyzing said current position information received by said position information reception means and calculating a current position ai;
map information storage means for storing map information;
central processing means for calculating current position display information, based on said current position ai calculated by said position information analysis means, and on said map information stored by said map information storage means;
display means for displaying said current position display information calculated by said central processing means; and,
direction measurement means for measuring the direction of advance; and characterized in that
said central processing means takes the current position at the start of navigation to be reference point a0, and upon receiving the current position ai after a prescribed time from said position information analysis means, calculates the direction a0→ai from said reference point a0 to said current position ai, and (a) if the direction a0→ai is outside the range of a tolerance angle γ from said direction of advance measured by said direction measurement means, uses current position display information calculated using said reference point a0 without modification; but (b) if the direction a0→ai is within the range of the tolerance angle γ from said direction of advance measured by said direction measurement means, calculates current position display information using said current position ai, and in addition takes a corrected position of said current position ai to be the new reference point.

16. The pedestrian navigation device according to claim 15, characterized in that said direction measurement means is an electronic compass.

17. The pedestrian navigation device according to claim 15, characterized in that said direction measurement means is a gyrosensor.

18. The pedestrian navigation device according to claim 15, characterized in that said position information reception means obtains current position information from a GPS (Global Positioning System).

19. A computer program product usable with a computer having a computer program embodied therein, said computer having a central processing means, said computer program when executed by said computer causes the computer to perform the steps of:

(A) obtaining current position information;

(B) analyzing said current position information received by said step (A) and calculating a current position ai;

(C) storing map information;

(D) calculating, by said central processing means, current position display information, based on said current position ai calculated by said step (B), and on said map information stored by said step (C); and, (E) displaying said current position display information calculated by said central processing means; and characterized in that said central processing means has pedestrian history information comprising a reference direction α indicating the direction of a past movement route and a reference distance β indicating a prescribed distance, takes the current position at the start of navigation to be reference point a0, and, upon receiving the current position ai after a prescribed time from said position information analysis means, calculates the distance La0ai between said reference point a0 and said current position ai, and when $$\beta > La0ai \tag{1}$$

corrects said current position ai in the direction of said reference direction α and calculates current position display information, but when $$\beta \leq La0ai \quad (2)$$

corrects said current position ai in the direction of said reference direction α and calculates current position display information, and in addition takes the corrected position of said current position ai to be the new reference point, and takes the direction from the previous reference point a0 to the new reference point to be the new reference direction α.

20. A computer program product usable with a computer having a computer program embodied therein, said computer having a central processing means, said computer program when executed by said computer causes the computer to perform the steps of:
  (A) obtaining current position information;
  (B) analyzing said current position information received by said step (A) and calculating a current position ai;
  (C) storing map information;
  (D) calculating, by said central processing means, current position display information, based on said current position ai calculated by said step (B), and on said map information stored by said step (C); and,
  (E) displaying said current position display information calculated by said central processing means; and characterized in that
  said central processing means receives the current position ai at prescribed intervals, and when the absolute value of the difference between a direction angle Ai from the preceding current position ai-1 to the present current position ai and a reference angle A is such that $$\alpha 0 \text{ (tolerance angle)} \geq |A-Ai| \quad (3)$$

calculates current position display information from said current position ai, and takes the direction angle Ai to be the new reference angle A.

21. A computer program product usable with a computer having a computer program embodied therein, said computer having a central processing means, said computer program when executed by said computer causes the computer to perform the steps of:
  (A) obtaining current position information;
  (B) analyzing said current position information received by said step (A) and calculating a current position ai;
  (C) storing map information;
  (D) calculating, by said central processing means, current position display information, based on said current position ai calculated by said step (B), and on said map information stored by said step (C); and,
  (E) displaying said current position display information calculated by said central processing means; and characterized in that
  said central processing means takes the current position at the start of navigation to be the reference point a0, receives the current position ai at prescribed intervals, calculates the distance La0ai between said reference point a0 and the current position ai, and when $$\beta \text{(reference distance)} > La0ai \quad (4)$$

calculates current position display information from said current position ai, but when $$\beta \text{(reference distance)} \leq La0ai \quad (5)$$

calculates current position display information from said current position ai, and in addition takes said current position ai to be the new reference point, and takes the direction from the previous reference point a0 to the new reference point ai to be the new reference direction α.

22. The computer program product according to claim 21, characterized in that said central processing means takes the current position at the start of navigation to be the reference point a0, receives the current position ai at prescribed intervals, calculates the distance La0ai between said reference point a0 and said current position ai, and when $$\beta \text{(reference distance)} > La0ai \quad (4)$$

calculates current position display information from said current position ai, but when $$\beta \text{(reference distance)} \leq La0ai \quad (5)$$

calculates current position display information from said current position ai, and in addition takes a current position al calculated next to said reference point a0 to be the new reference point, and takes the direction from the previous reference point a0 to said current position ai to be the new reference direction α.

23. A computer program product usable with a computer having a computer program embodied therein, said computer having a central processing means, said computer program when executed by said computer causes the computer to perform the steps of:
  (A) obtaining current position information;
  (B) analyzing said current position information received by said step (A) and calculating a current position ai;
  (C) storing map information;
  (D) calculating, by said central processing means, current position display information, based on said current position ai calculated by said step (B), and on said map information stored by said step (C); and,
  (E) displaying said current position display information calculated by said central processing means; and characterized in that
  said central processing means has a reference direction a indicating the direction of a past movement route and a prescribed tolerance angle γ, takes the current position at the start of navigation to be reference point a0, and, upon receiving the current position ai after a prescribed time from said position information analysis means, calculates the direction a0→ai from said reference point a0 to said current position ai, and
    (a) if the direction a0→ai is outside the range of the tolerance angle γ from the reference direction α, uses current position display information calculated using said reference point a0 without modification; but
    (b) if the direction a0→ai is within the range of the tolerance angle γ from the reference direction α, calculates current position display information using said current position ai, and moreover takes a corrected position of said current position ai to be the new reference point, and takes the direction from the previous reference point a0 to the new reference point ai to be the new reference direction α.

24. A computer program product usable with a computer having a computer program embodied therein, said computer having a central processing means, said computer program when executed by said computer causes the computer to perform the steps of:
  (A) obtaining current position information;
  (B) analyzing said current position information received by said step (A) and calculating a current position ai;
  (C) storing map information;

(D) calculating, by said central processing means, current position display information, based on said current position ai calculated by said step (B), and on said map information stored by said step (C);

(E) displaying said current position display information calculated by said central processing means; and, (F) measuring the direction of advance; and characterized in that said central processing means takes the current position at the start of navigation to be reference point a0, and upon receiving a current position a1 after a prescribed time from said position information analysis means, corrects said current position al in said direction of advance measured by said step (F) and calculates current position display information, and in addition takes the corrected position of said current position al to be the new reference point.

25. A computer program product usable with a computer having a computer program embodied therein, said computer having a central processing means, said computer program when executed by said computer causes the computer to perform the steps of:

(A) obtaining current position information;

(B) analyzing said current position information received by said step (A) and calculating a current position ai;

(C) storing map information;

(D) calculating, by said central processing means, current position display information, based on said current position ai calculated by said step (B), and on said map information stored by said step (C);

(E) displaying said current position display information calculated by said central processing means; and, (F) measuring the direction of advance; and characterized in that said central processing means takes the current position at the start of navigation to be reference point a0, and upon receiving the current position ai after a prescribed time from said position information analysis means, calculates the direction a0→ai from said reference point a0 to said current position ai, and (a) if the direction a0→ai is outside the range of a tolerance angle γ from said direction of advance measured by said step (F), uses current position display information calculated using said reference point a0 without modification; but (b) if the direction a0→ai is within the range of the tolerance angle γ from said direction of advance measured by said step (F), calculates current position display information using said current position ai, and in addition takes a corrected position of said current position ai to be the new reference point.

* * * * *